United States Patent [19]

Sauer

[11] Patent Number: 5,329,681
[45] Date of Patent: Jul. 19, 1994

[54] PROCESS FOR PREPARING THE POROUS METALLIC FRAMEWORK OF AN ELECTRODE CARRIER FOR THE ATTACHMENT OF A TAKE-OFF CONDUCTOR

[75] Inventor: Hans Sauer, Idstein-Walsdorf, Fed. Rep. of Germany

[73] Assignee: Varta Batterie Aktiengesellschaft, Hanover, Fed. Rep. of Germany

[21] Appl. No.: 706,643

[22] Filed: May 29, 1991

[30] Foreign Application Priority Data

Jun. 15, 1990 [DE] Fed. Rep. of Germany ....... 4019256

[51] Int. Cl.⁵ .................. B23P 13/00; H01M 4/80
[52] U.S. Cl. .......................... 29/2; 429/235; 429/237
[58] Field of Search .................... 29/2; 429/235, 237

[56] References Cited

U.S. PATENT DOCUMENTS

| | | | |
|---|---|---|---|
| 1,940,385 | 12/1933 | Ackermann | 429/221 |
| 1,988,861 | 1/1932 | Thorausch et al. | 429/221 |
| 2,544,112 | 3/1951 | Schneider | 29/2 |
| 2,724,733 | 11/1955 | Hagspihl et al. | 29/2 |
| 4,251,603 | 2/1981 | Matsumoto et al. | 429/235 |
| 5,154,993 | 10/1992 | Beatty | 29/2 |
| 5,196,281 | 3/1993 | Pensabene et al. | 429/235 |

FOREIGN PATENT DOCUMENTS

| | | | |
|---|---|---|---|
| 589193 | 12/1959 | Canada | 429/235 |
| 2211233 | 9/1972 | Fed. Rep. of Germany . | |
| 2327885 | 12/1974 | Fed. Rep. of Germany | 429/235 |
| 2427421 | 1/1975 | Fed. Rep. of Germany | 429/235 |
| 2427422 | 1/1975 | Fed. Rep. of Germany | 429/235 |
| 2535469 | 2/1977 | Fed. Rep. of Germany . | |
| 170166 | 9/1985 | Japan | 29/2 |

Primary Examiner—Wayne Langel
Attorney, Agent, or Firm—Weiser & Associates

[57] ABSTRACT

Discrete locations of an electrode web or electrode segment based on a porous metallic carrier framework, which are intended to receive the take-off conductor, are briefly heated to about 450° C. and then cleared of active mass with compressed air. The heating, for which a stream of hot air is particularly suitable, has the effect of destroying the organic binder present in the active material. Following such treatment, a clean metal surface is made available for the welded attachment of the take-off conductor, of a size which is limited to the precise dimensions necessary for the connection.

12 Claims, No Drawings

PROCESS FOR PREPARING THE POROUS METALLIC FRAMEWORK OF AN ELECTRODE CARRIER FOR THE ATTACHMENT OF A TAKE-OFF CONDUCTOR

Background of the Invention

This invention relates to the electrical and mechanical connection of a metal strip which serves as the current take-off to an electrode of a galvanic element having a porous metallic framework as its carrier.

The trouble-free attachment of the current take-off to a battery electrode requires that the metallic carrier portion of the electrode have, at the intended attachment point, a metallic portion which is freely accessible and which is not contaminated by the electrode-active material. This serves to keep the contact resistance developed across the subsequent spot weld as low as possible. In ultrasonic welding, a clean contact surface is required for higher performance values.

From German Patent Publication (DE-AS) 2,211,233, for example, it is known to uniformly coat a tape-like wire mesh made of nickel, nickel plated iron, or copper, with a powdered active mass. Flat pieces are then cut from the coated web, and are reinforced by straight-bending at their edges. Current take-offs are then welded to these cut segments, at discrete points along the reinforced edges, following removal of the compressed active material. However, removal of the active mass is difficult, and often incomplete.

In the production of sinter foil electrodes, a solid metal edge of the center web, to which a current take-off may be welded, is customarily excluded (isolated) from impregnation with the electrode active material. However, in order to isolate this edge, suitable precautions must be taken during application of the porous nickel sinter layers to the foil carrier web. This requires additional effort, as compared to a uniform processing of the carrier web.

According to German Patent (DE-PS) 2,535,469, it is possible to weld a metallic take-off conductor directly to a sinter foil electrode if the active material which is embedded in its porous electrode framework, e.g., nickel hydroxide, is first reduced at the desired attachment point by dripping a solution of hydrazine hydrate or sodium borate onto the metal. For rechargeable battery systems, electrodes based upon porous metallic frameworks have been used as carriers and current collectors.

These tape-like porous structures (produced galvanically) can easily be filled with active mass due to their high porosity (i.e., 95 to 97%) through soaking or pasting, and are particularly suited to the production of wound electrodes. The attachment of take-off conductors takes place, for example, by sealing and gluing closed the selected attachment points, even before application of the active mass. The carrier web is then impregnated with the active mass, dried and rolled. Following removal of the protective mass, the take-off conductors are welded at the desired attachment points, which are then free of the pasted or suspended mass.

This procedure is complicated, and rather impractical, because such manufactured webs tend to experience a change in length during post-rolling to their desired final thickness, which can be as much as 20%. As a result, the ultimate locations of the attachment points cannot be precisely determined, and a certain variation in location must therefore be taken into account during subsequent stamping or separating of the electrode strips.

SUMMARY OF THE INVENTION

It is therefore the objective of this invention to provide a pre-treatment of finished porous metallic framework electrodes before attachment (by welding) of the take-off conductors, to ensure a clean and homogenous connection.

This object, and others which will appear, are achieved in accordance with the present invention by heating and then air-blasting the surface of a porous metallic framework carrier or plate made of a sponge-like metal matrix (metal foam) as disclosed in U.S. Pat. No. 4,251,603 at the intended point of attachment for the take-off conductor, prior to welding the take-off conductor to the carrier.

DETAILED DESCRIPTION OF THE INVENTION

In accordance with the present invention, the intended contact location of a porous metallic carrier is first subjected to heating. This alters (decomposes) active material contained within the pores of the metallic framework, so that the active material can then be expelled with a jet of air.

Because the active mass which is pasted or soaked into the porous metallic framework normally contains an organic binder, it is in principle the destruction by heat of this organic substance (in addition to moisture) which deprives the active material of its ability to adhere to the walls of the pores. As a result, after being heated the active material behaves like a dry powder and can then be readily blown from the pores by a stream of gas under pressure; in particular, a stream of compressed air.

A variety of heat sources may be used to accomplish this thermal decomposition. For example, a heated die, a laser beam, or induction heating may be used. In any event, the required temperature, depending upon the resistance to heat of the binder material to be removed, should be in a range of from about 300° C. to 550° C.

It is particularly advantageous to direct a stream of hot air at a temperature which lies in the above-mentioned range, and preferably at about 450°, upon the location to be prepared before the area to be cleared of all non-metallic residues is subjected to the stream of compressed air. For a reliable removal of residues, stream pressures of from about 7 to 8 bar are necessary, with the compressed gas preferably issuing from a small nozzle. The resulting gas flow is too high for simultaneous use as both the source of heat (for achieving the desired thermal decomposition) and the compressed air stream, because the amount of energy which would be necessary to heat such quantities of air to the desired temperature (e.g., to about 450) would not be economical. Conversely, the hot air stream which is used to heat the surface would be too weak to also serve as the compressed air stream. As a consequence, a two-stage procedure is preferred.

It is further advantageous to cover the electrode web with an effective heat conducting metal sheet (e.g., a copper sheet), and to stamp from this the desired application point for the take-off conductor. This serves to concentrate the heat upon the attachment surface, which approximates the outline of the take-off conductor strip, and which is necessary for the welded connection.

Under such conditions, the binder material is generally decomposed within about 3 to 12 seconds, and in most cases within 5 to 7 seconds, without the occurrence of any significant oxidation of the carrier metal in this region.

The disclosed concentrated heating effect is further advantageously accomplished from both sides of the carrier, by directing a hot air stream from both sides upon the contact location. After the binder material of the active mass has been destroyed, the treated location can then readily be blown free of active mass with compressed air, or with a blower, as previously described. In any event, the basis (surface) for a trouble-free welded connection with the take-off conductor results.

The particular advantage of the procedure of the present invention, from a manufacturing standpoint, is that the attachment of the take-off conductor takes place only after the carrier web has been subjected to all of the treatments associated with mass impregnation, including post-rolling and drying, so that exposed attachment points are not subjected to rollers, guides and the like, which could compromise the web, or which could themselves be damaged during such transport. The locations of the contact points which need to be cleared of active material (upon the electrode web) can then be precisely located, in their desired distribution. It is still further advantageous to treat electrodes in accordance with the process of this invention, after they have been cut to their final dimensions. In such case, only that small segment of the electrode surface which is needed for welded connection with the take-off conductor is effected by the treatment of the present invention.

It will be understood that various changes in the details, materials and arrangement of parts which have been herein described and illustrated in order to explain the nature of this invention may be made by those skilled in the art within the principle and scope of the invention as expressed in the following claims.

What is claimed is:

1. A process for preparing an electrode of a galvanic element which has a porous metallic framework carrier, to form a contact location for electrical and mechanical connection with a metal strip which serves as a take-off conductor, comprising the steps of:
    heating the contact location by exposing the contact location to a heat source; and thereafter
    subjecting the heated contact location to a stream of gas under pressure prior to connection of the take-off conductor.

2. The process of claim 1 wherein the contact location is heated by a heated air stream.

3. The process of claim 1 wherein the contact location is heated to a temperature of from about 300° C. to about 550° C.

4. The process of claim 3 wherein the contact location is heated to approximately 450° C.

5. The process of claim 2 wherein the contact location is heated from both sides.

6. The process of claim 1 wherein the contact location is heated by a hot die, a laser beam, or induction heating means.

7. The process of claim 1 which further comprises the step of segregating the contact location to be treated, by covering remaining portions of the electrode surface.

8. The process of claim 7 wherein said covering is a heat-conducting metal sheet.

9. A process for preparing an electrode of a galvanic element which has a porous metallic framework carrier and an active mass applied to the porous metallic framework carrier, to form a contact location for electrical and mechanical connection with a metal strip which serves as a take-off conductor, comprising the steps of:
    heating the contact location by exposing the contact location to a heat source, thermally decomposing the active mass at the contract location; and thereafter
    subjecting the heated contact location to a stream of gas under pressure, expelling the thermally decomposed active mass from pores of the metallic framework carrier prior to connection of the take-off conductor.

10. The process of claim 9 wherein the active mass incorporates an organic binder, and wherein the organic binder is thermally decomposed by the heating step.

11. The process of claim 9 wherein the porous metallic framework carrier has a surface which includes the contact location, and wherein the stream of gas under pressure is directed onto the surface of the porous metallic framework carrier at the contact location, expelling the thermally decomposed active mass from the surface of the porous metallic framework carrier and clearing the contact location of the active mass prior to connection of the take-off conductor.

12. The process of claim 11 wherein the contact location is heated from both sides.

* * * * *